(12) United States Patent
Johnson et al.

(10) Patent No.: US 7,931,457 B2
(45) Date of Patent: Apr. 26, 2011

(54) APPARATUS FOR PRODUCING SUB-MICRON FIBERS, AND NONWOVENS AND ARTICLES CONTAINING SAME

(75) Inventors: Michael H. Johnson, Mooresville, NC (US); Timothy Krause, Mooresville, NC (US); Michael W. Hayes, Buena Vista, VA (US); Rajeev Chhabra, Mason, OH (US); Savas Aydore, West Chester, OH (US); Olaf Erik Alexander Isele, West Chester, OH (US); Han Xu, West Chester, OH (US)

(73) Assignee: Polymer Group, Inc., Charlotte, NC (US)

( * ) Notice: Subject to any disclaimer, the term of this patent is extended or adjusted under 35 U.S.C. 154(b) by 0 days.

(21) Appl. No.: 12/623,463

(22) Filed: Nov. 23, 2009

(65) Prior Publication Data

US 2010/0120314 A1    May 13, 2010

Related U.S. Application Data

(62) Division of application No. 11/550,624, filed on Oct. 18, 2006, now Pat. No. 7,666,343.

(51) Int. Cl.
*B29C 39/14* (2006.01)
(52) U.S. Cl. .................. 425/72.2; 425/378.2; 425/382.2
(58) Field of Classification Search .................. 425/72.2, 425/387.2, 382.2
See application file for complete search history.

(56) References Cited

U.S. PATENT DOCUMENTS

| | | | |
|---|---|---|---|
| 4,211,737 A | 7/1980 | Di Drusco et al. | |
| 4,536,361 A | 8/1985 | Torobin | |
| 4,708,619 A | 11/1987 | Balk | |
| 4,813,864 A | 3/1989 | Balk | |
| 4,820,142 A | 4/1989 | Balk | |
| 4,838,774 A | 6/1989 | Balk | |
| 5,087,186 A | 2/1992 | Buehning | |
| 5,183,670 A | 2/1993 | Trudeau | |
| 5,260,003 A | 11/1993 | Nyssen et al. | |
| 6,183,670 B1 | 2/2001 | Torobin et al. | |
| 6,315,806 B1 | 11/2001 | Torobin et al. | |
| 6,382,526 B1 | 5/2002 | Reneker et al. | |
| 6,427,745 B1 | 8/2002 | Allen | |
| 6,520,425 B1 | 2/2003 | Reneker | |
| 6,565,344 B2 | 5/2003 | Bentley et al. | |
| 6,695,992 B2 | 2/2004 | Reneker | |
| 2003/0137069 A1 | 7/2003 | Reneker | |
| 2004/0099981 A1 | 5/2004 | Gerking | |
| 2005/0053782 A1 | 3/2005 | Sen et al. | |

FOREIGN PATENT DOCUMENTS

| | | |
|---|---|---|
| EP | 0173333 A | 3/1986 |
| GB | 1355913 A | 6/1974 |
| GB | 2187133 A | 9/1987 |

OTHER PUBLICATIONS

Patent Abstracts of Japan, Publ. No. 2005029931 A, Feb. 3, 2005, Toshio et al., JPO&NCIPI, 1 page.
European Search Report dated Feb. 21, 2008 and examination sheets, EP appln. No. 07020436.7 (related to instant US appln.), 12 pages total.

*Primary Examiner* — Joseph S Del Sole
*Assistant Examiner* — James Sanders
(74) *Attorney, Agent, or Firm* — Kilyk & Bowersox, P.L.L.C.; Valerie Calloway

(57) ABSTRACT

An apparatus for producing sub-micron fibers, and more specifically an apparatus for effecting formation of sub-micron fibers by fibrillation of polymer films, and nonwoven materials and articles incorporating them.

20 Claims, 11 Drawing Sheets

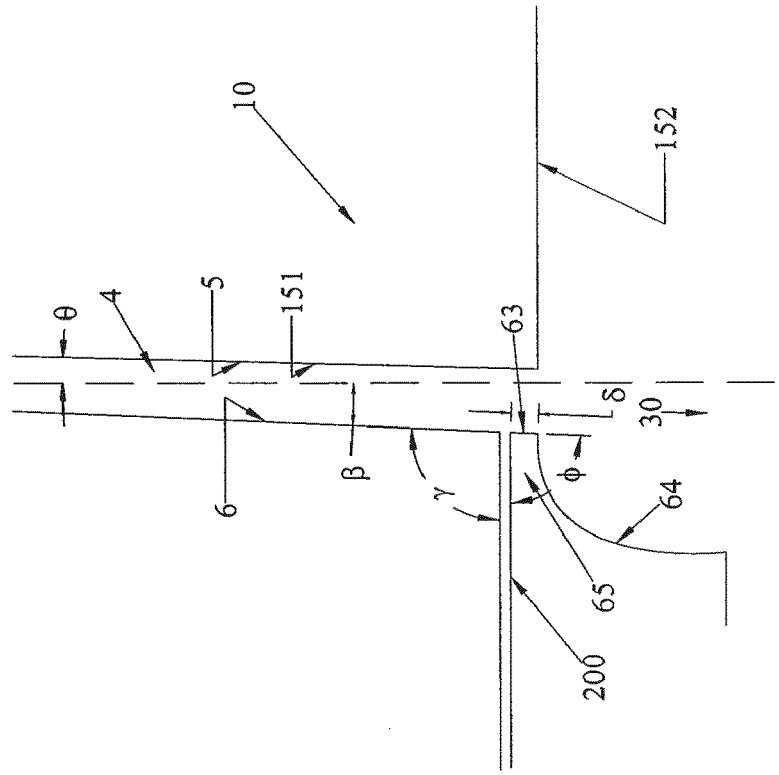
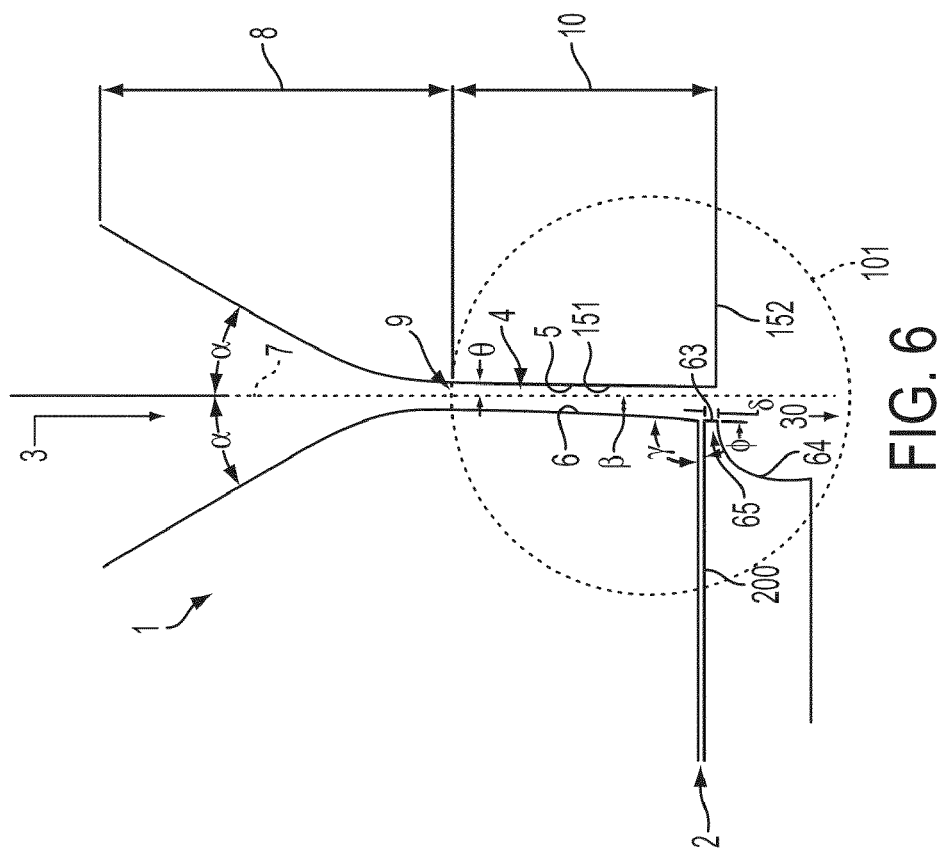

APPARATUS FOR PRODUCING SUB-MICRON FIBERS, AND NONWOVENS AND ARTICLES CONTAINING SAME

CROSS-REFERENCE TO RELATED APPLICATION(S)

The present application is a divisional of U.S. patent application Ser. No. 11/550,624, filed Oct. 18, 2006, now U.S. Pat. No. 7,666,343 B2, which is hereby incorporated herein by reference in its entirety.

TECHNICAL FIELD

The present invention generally relates to producing sub-micron fibers, and more specifically relates to a process and apparatus for effecting formation of sub-micron fibers by fibrillation of polymer films, and nonwoven materials and articles incorporating them.

BACKGROUND ART

Continuous and discontinuous filament spinning technologies are known in art, and are commonly referred to as spunmelt technologies. Spunmelt technologies include both the meltblown or spunbond processes. A spunbond process involves supplying a molten polymer, which is then extruded under pressure through a large number of orifices in a plate known as a spinneret or die. The resulting continuous filaments are quenched and drawn by any of a number of methods, such as slot draw systems, attenuator guns, or Godet rolls. The continuous filaments are collected as a loose web upon a moving foraminous surface, such as a wire mesh conveyor belt. When more than one spinneret is used in line for the purpose of forming a multi-layered fabric, the subsequent webs are collected upon the uppermost surface of the previously formed web.

The melt-blown process is related to means of the spunbond process for forming a layer of a nonwoven fabric, wherein, a molten polymer is extruded under pressure through orifices in a spinneret or die. High velocity gas impinges upon and attenuates the filaments as they exit the die. The energy of this step is such that the formed filaments are greatly reduced in diameter and are fractured so that microfibers of indeterminate length are produced. This differs from the spunbond process whereby the continuity of the filaments is preserved.

Spunmelt equipment manufacturing companies, such as Reifenhäuser, Ason Neumag, Nordson, and Accurate Products have engineered numerous meltblown and/or spunbond manufacturing models that offer a variety of desirable attributes, such as increased polymer throughputs, better management of process air flow or polymer distribution, and improved control of filament deviations, to name a few. U.S. Pat. Nos. 4,708,619; 4,813,864; 4,820,142; 4,838,774; 5,087,186; 6,427,745; and 6,565,344, all of which are incorporated herein by reference, disclose examples of manufacturing equipment for the processing of spunbond or meltblown materials.

There is an increasing demand for articles produced from nonwoven containing sub-micron fibers. The diameters of sub-micron fibers are generally understood to be less than about 1000 nanometer (i.e., one micron). The sub-micron fibers webs are desired due to their high surface area, low pore size, and other characteristics. The sub-micron fibers can be produced by a variety of methods and from a variety of materials. Although several methods have been used, there are drawbacks to each of the methods and producing cost effective sub-micron fibers has been difficult. Conventional spunmelt equipment arrangements can not provide high quality, low defect fibers and webs that are predominantly microfine including submicron diameter fibers with narrow fiber size distributions.

Methods of producing sub-micron fibers include a class of methods described by melt fibrillation. Non limiting examples of melt fibrillation methods include melt blowing, melt fiber bursting, and melt film fibrillation. Methods of producing sub-micron fibers, not from melts, are film fibrillation, electro-spinning, and solution spinning. Other methods of producing sub-micron fibers include spinning a larger diameter bi-component fiber in an islands-in-the-sea, segmented pie, or other configuration where the fiber is then further processed so that sub-micron fibers result.

Melt fibrillation is a general class of making fibers defined in that one or more polymers are molten and extruded into many possible configurations (e.g. co-extrusion, homogeneous or bicomponent films or filaments) and then fibrillated or fiberized into filaments.

Melt film fibrillation is another method to produce fibers. A melt film is produced from the melt and then a fluid is used to form fibers from the melt film. Two examples of this method include Torobin's U.S. Pat. Nos. 6,315,806; 5,183,670; and 4,536,361; and Reneker's U.S. Pat. Nos. 6,382,526, 6,520,425 and 6,695,992, assigned to the University of Akron.

Electrospinning is a commonly used method of producing sub-micron fibers. In one manifestation of this method, a polymer is dissolved in a solvent and placed in a chamber sealed at one end with a small opening in a necked down portion at the other end. A high voltage potential is then applied between the polymer solution and a collector near the open end of the chamber. The production rates of this process are very slow and fibers are typically produced in small quantities. Another spinning technique for producing sub-micron fibers is solution or flash spinning which utilizes a solvent.

One of the ways to achieve high melt shear for a melt film fibrillation process is through high-speed gas (i.e., close to sonic or supersonic gas velocities). To obtain supersonic or transonic (close to sonic) velocities, flow typically needs to converge to a throat (narrowest part of the nozzle where the velocity reaches sonic levels) and then expands in a diverging section. Adiabatic nozzles (no heat gained or lost through the boundaries of the nozzle system) meeting these general criteria are known in the art, and include so-called Laval nozzles. Use of Laval type nozzles in fiber formation are disclosed, e.g., in U.S. Pat. Appln. Publ. No. 2004/0099981 A1, and U.S. Pat. Nos. 5,075,161 and 5,260,003. These methods utilize Laval nozzles to speed up the gas velocities to sonic and/or supersonic range. When polymer melt is exposed to such high gas velocities, it bursts into multiplicity of fine fibers. They generally use concentric input and channeling of gas and polymer melt in the discharge nozzles, which can be non-optimal from standpoints of equipment lay-out complexity and equipment maintenance, etc. However, other nozzle configurations, such as non-concentric (non-annular) layouts of nozzles pose challenges of their own. For instance, in a fiber or filament nozzle system where polymer melt and gas introduction proceed from separate side-by-side units, a problem tends to arise when the fiberization gas flows between a side with a surface or wall that is heated to a high temperature (e.g., due to polymer melt flow introduction from that side) and a surface or wall of an opposing side (for example, an gas introduction side) that is at a lower temperature than the polymer melt side. In such a scenario, gas flow tends to become unstable in the diverging section in prior nozzle configurations such as with a Laval nozzle. This leads to problems of lack of polymer shear, polymer back-flow or build-up into the gas side of the gas passage, and subsequently an unevenly varying excessive and diminishing polymer flow and fiberization. After sufficient melt build up occurs upstream into the gas side, polymer melt separates and is typically blown out as a "shot," since the melt locally cools down and can no longer form fibers due to insufficient shearing of polymer. When the polymer flow starves as the other result of those variations, the shearing is excessive leading to undesired dust. New advances have been needed to allow production of consistently high quality sub-micron fibers for disposable articles in a more efficient manner at commercially-significant output levels.

SUMMARY

The present invention is directed to high quality, low defect sub-micron fibers and nonwovens incorporating the sub-micron fibers that are produced in a unique single step, melt film fibrillation, high throughput process, and a nozzle device used for this purpose. Nonwoven products are attained that contain high quality microfiber content, which in one aspect exceeds 99% sub-micron fiber content, at commercial scale throughputs. Increased polymer shear and reduction of polymer back-flow or build-up problems otherwise leading to undesired fiber defects, such as shot development within a nozzle system, are also achieved by the present invention. With the present invention, high quality, microfibrous nonwoven products having improved barrier properties, softness, absorbency, opacity and/or high surface area are provided that are suitable for a large variety of industrial and consumer care fibrous products.

A process for making a nonwoven web has been found for producing high quality, high output sub-micron fiber product by providing a pressurized gas stream flowing within a gas passage confined between first and second opposing walls which define respective upstream converging and downstream diverging wall surfaces into which polymer melt is introduced to provide an extruded polymer film on a heated wall surface that is impinged by the gas stream flowing within the gas passage, effective to fibrillate the polymer film into sub-micron diameter fibers. "Converging" means that the cross-sectional area decreases in the direction of gas flow; and "diverging" means that the cross-sectional area increases in the direction of gas flow. In one embodiment, the gas passage comprises a first, upstream section into which the gas enters from a supply end, a transition region, and a second, downstream section in which the gas flows to an exit end, wherein the transition region fluidly connects the first section to the second section, and the gas passage ends at the exit end of the second section. In a particular embodiment, the first section of the gas passage has a monotonically decreasing cross-sectional area from the supply end to the transition region, and the second section of the gas passage has a monotonically increasing cross-sectional area from the transition region to the exit end of the second section. At least one flowing polymer fluid stream is transmitted through at least one bounded polymer passage which ends in at least one opening in at least one of the opposing heated walls. Polymer is heated sufficiently in transit to make and keep it flowable until introduced into the gas passage. Each polymer fluid stream extrudes in the form of a film from each opening. Each extruded polymer film joins with the gas stream and the polymer film is fibrillated to form fibers comprising sub-micron fibers exiting from the exit end of the second section of the gas passage. For purposes herein, "monotonically decreasing cross-sectional area" means "strictly decreasing cross-sectional area" from the upper (inlet) end to the lower end of the upstream nozzle section, and "monotonically increasing cross-sectional area" means "strictly increasing cross-sectional area" from the upper end to the exit end of the downstream section of the nozzle.

Although not desiring to be bound to any theory, it is thought that the introduction of heated polymer as a film on a heated support wall which in part defines the gas passage within the nozzle as described herein makes it possible to maintain and control gas flow uniformity in an enhanced manner such that the fibrillated fiber product has improved size distribution that is weighted towards or is even exclusively in the sub-micron fiber size range.

In a particular embodiment, each extruded polymer film joins with the gas stream in the second section of the gas passage. The introduction of the polymer melt in the second section of the nozzle system on a heated diverging support wall has been found to especially facilitate production of high quality, high content sub-micron fibers and resulting webs at commercial throughputs. In a further embodiment, the location where the extruded polymer film joins with the gas in the second, downstream section in order to produce the best quality fibers and web depends on the type of gas, the nozzle geometry, including angles and transitions, and the pressure of the gas, and is preferably located in the upper half of the second section such as for low gas pressure conditions, and is preferably located in the lower, downstream half of the second section such as for high gas pressure conditions. In a particular embodiment, only one polymer film forms on at least one of the opposite heated walls, the gas pressure exceeds about 10 psi, and each polymer passage opening from which polymer film extrudes is located in a second, downstream half of the second section between the transition region and the exit end of the second section. It has been found that the second half of the downstream second section can provide an optimal gas velocity region where melt film fibrillation is accomplished very efficiently, yielding higher quality microfiber product.

As another advantage of the present invention, increased sub-micron fiber output is obtained with lower gas demand. Lowered gas demand makes it possible to reduce energy consumption and/or use smaller scale unit operations to still provide commercially significant sub-micron fiber output levels. In one embodiment, the gas stream and polymer fluid stream are introduced into the second section at a gas stream/polymer fluid stream mass flow rate ratio less than about 40:1, particularly less than about 30:1; more particularly less than about 15:1. The gas stream to polymer fluid stream mass flow ratio is calculated as kilogram per hour per meter of gas stream through the gas passage to kilogram per hour per meter of polymer fluid stream through all the polymer openings in the second section of the gas passage.

In more particular embodiments, each polymer passage opening may be a slit with a hydraulic diameter defined as four times cross-sectional area of the polymer passage opening divided by inner perimeter of the polymer passage opening, said hydraulic diameter of each polymer passage opening ranging from about 0.001 inch to about 0.100 inch. The polymer film generally has a polymer film thickness not exceeding the hydraulic diameter of the polymer passage opening. The polymer fluid may expand upon exiting the polymer passage opening, for example, due to die swell phenomenon without being limited by theory. However, the polymer fluid film thickness almost instantaneously becomes lesser than or equal to the hydraulic diameter of the polymer passage opening.

In characterizing the geometry of the wall-defined gas passage of the nozzle of the present invention, a first imaginary bisecting surface, defined as an angular bisector of the angle between the first and second walls in the first section, geometrically divides the first section into two halves with about equal volumes, and a second imaginary bisecting surface, defined as an angular bisector of the angle between the first and second walls in the second section, geometrically divides the second section into two halves with about equal volumes. The imaginary bisecting surface may be planar or curvilinear, depending on the embodiment of the present invention, as will be more apparent from the detailed descriptions herein. In a general embodiment, the bisection angle of the first and the second walls with respect to the first imaginary bisecting surface ranges from about 15 to about 40 degrees in the first section, and the bisection angle of the first and the second walls with respect to the second imaginary bisecting surface ranges from about 2 to about 20 degrees in the second section of the gas passage.

The opposing walls of nozzle where polymer is introduced into the gas passage may be operated such that they are thermally similar or different. In one embodiment, the first and second walls of the gas passage are heated to approximately the same temperature to provide symmetric thermal states with respect to the first and the second imaginary bisecting surfaces. In an alternative embodiment, one of the opposing walls may be a hot wall while the other wall is a cold wall, wherein temperature of the hot wall is at least higher than the cold wall, such as at least 50° C. higher, and only the hot wall has at least one polymer fluid passage opening. In this configuration, the microfibers may be produced in a hot melt/"cold" gas (e.g., unheated air) fibrillation environment that reduces process complexity and costs. In this embodiment, the hot wall in the second section diverges away from the first imaginary bisecting surface at an angle that ranges from about 1 degree to 20 degrees, and the cold wall in the second section converges towards the first imaginary bisecting surface at an angle that ranges from about 0.1 degree to about 15 degrees. The ratio between the diverging angle of the hot wall relative to the first imaginary bisecting surface and the converging angle of the cold wall relative to the first imaginary bisecting surface may range from about 1:1 to about 500:1. The angle between centerline of each polymer passage and the wall containing the corresponding polymer passage opening may range from about 10 degrees to about 100 degrees. The polymer film extruding from each polymer passage opening may flow with the gas flow along a polymer fiberization surface, which has an orientation angle with respect to the first bisecting surface ranging from about 90 degrees measured in clockwise direction to about 45 degrees measured in counterclockwise direction. The length of the polymer fiberization surface corresponding to each polymer passage opening may be less than about one thousand times the hydraulic diameter of the corresponding polymer passage opening.

In another embodiment, the first and second walls of the gas passage are smoothly curved such that the curvature of the opposing walls in the first section smoothly transitions without any sharp edges into the curvature of the opposing walls in the second section in the region of smallest cross-section area of the gas passage. The opposing walls in the second section of the gas passage may be curved such that the hot wall has a convex shape that curves away from the second imaginary bisecting surface and the cold wall has a concave shape that curves towards the second imaginary bisecting surface as viewed from within the second section in the gas passage. The ratio of the radius of curvature of the hot wall to the radius of curvature of the cold wall in the second section of the gas passage ranges from about 1:10,000 to about 100:1. The gas stream is introduced into the gas passage at a mass flow rate ranging from about 150 kilogram per hour per meter to about 3500 kilogram per hour per meter.

The nozzle used in the processes described herein for making nonwoven webs comprising sub-micron fibers represents another embodiment of the present invention. The inventive nozzle device is not limited to any particular type of polymer material or fibrillating gas and allows for the polymer to be independently selected for a specific application from amongst a wide variety of polymeric materials. Particularly the fibrillating gas is a gaseous material such as air, nitrogen, steam, etc. The gas may be used as a single type thereof or as combinations of different gases. Additionally suitable gases may include reactive gases or gases with reactive components, or combinations thereof. In embodiments, the gas generally may be inert to the nozzle wall materials. For purposes herein, the terms "nozzle system" and "nozzle" are used interchangeably.

The high quality microfibers provided by the present invention are provided within narrow fiber size distributions with minimal fiber defects. The raw nonwoven web product materials directly collected from the process of the present invention generally may comprise more than 35%, particularly more than 75%, and more particularly more than 99% sub-micron fibers. The standard deviation of fiber diameter distribution generally may be less than about 0.5 micron, particularly less than about 0.3 micron. The present invention also may be used in production of microfibers in the range of meltblown fibers. The present invention can be implemented on a wide variety polymer materials. The fibers may be comprised of a polymer, e.g., selected from amongst polyolefins, polyesters, polyamides, biodegradable polymers, polyurethanes, polystyrenes, alkyd resins, poly-hydroxyalkanoic acids, adhesives and other compounds capable of making fibers, and combinations thereof. The nonwoven web may be used in a wide variety of articles by itself or in combination with other materials. The nonwoven web may be used, for example, in filters, medical apparel, medical cleaning wipes, housewrap construction materials, bandages, protective clothing, battery separators, catalyst carrier, diapers, training pants, adult incontinence pads, catamenials products such as feminine care pads and pantiliners, tampons, personal cleansing articles, personal care articles, and personal care wipes such as baby wipes, facial wipes, body wipes and feminine wipes, and combinations thereof.

Other features and advantages of the present invention will become readily apparent from the following detailed description, the accompanying drawings, and the appended claims.

BRIEF DESCRIPTION OF THE DRAWINGS

FIG. 6 is a sectional view of an illustrative embodiment of a nozzle system including a defined impingement surface according to another embodiment of the present invention for forming sub-micron fibers.

FIG. 7 is an enlarged sectional view of a downstream portion of the nozzle system according to FIG. 6.

Figure 1:
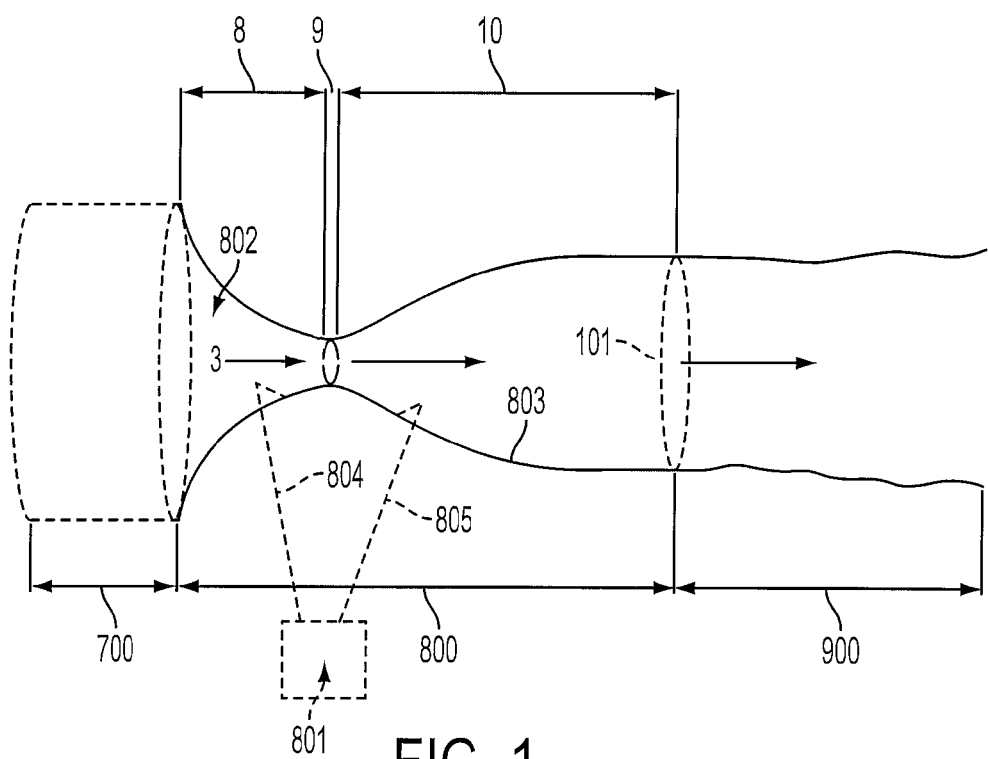
FIG. 1 is an enlarged generalized sectional view of a nozzle system of the present invention for forming sub-micron fibers.

The features depicted in the figures are not necessarily drawn to scale. Similarly numbered elements in different figures represent similar components unless indicated otherwise.

DETAILED DESCRIPTION

While the present invention is susceptible of embodiment in various forms, there is shown in the drawings and will hereinafter be described a presently preferred embodiment of the invention, with the understanding that the present disclosure is to be considered as an exemplification of the invention, and is not intended to limit the invention to the specific embodiment illustrated.

Referring to FIG. 1, a general nozzle system 800 is depicted for making fibers, and by way of example, an annular, axisymmetric system is shown. Gas is pressurized in element 700, from which gas stream 3 is supplied and enters a first nozzle section 8 having a generally converging geometry and flows towards and through a transition region 9, and then the gas stream enters into and expands in a second nozzle section 10 having generally diverging geometry before leaving the nozzle system through the exit plane 101 into the atmospheric environment 900. The transition region 9 represents a narrowed throat section of the nozzle in which the upstream converging section is transitioned into the downstream diverging section. The transition region or throat includes the smallest cross-sectional area of the nozzle. Polymer melt is fed from a polymer extrusion body 801 or other molten polymer source to the gas passage 802 or interior of the nozzle 800. As indicated by the non-limiting dashed lines 804-805 depicted in the figure, polymer melt can be introduced anywhere in the nozzle 800 provided that a polymer film is provided on an inner heated wall surface 803 of the nozzle 800 that is impinged by the gas stream 3 flowing within the gas passage 802, effective to fibrillate the polymer film into sub-micron diameter fibers.

Figure 2:
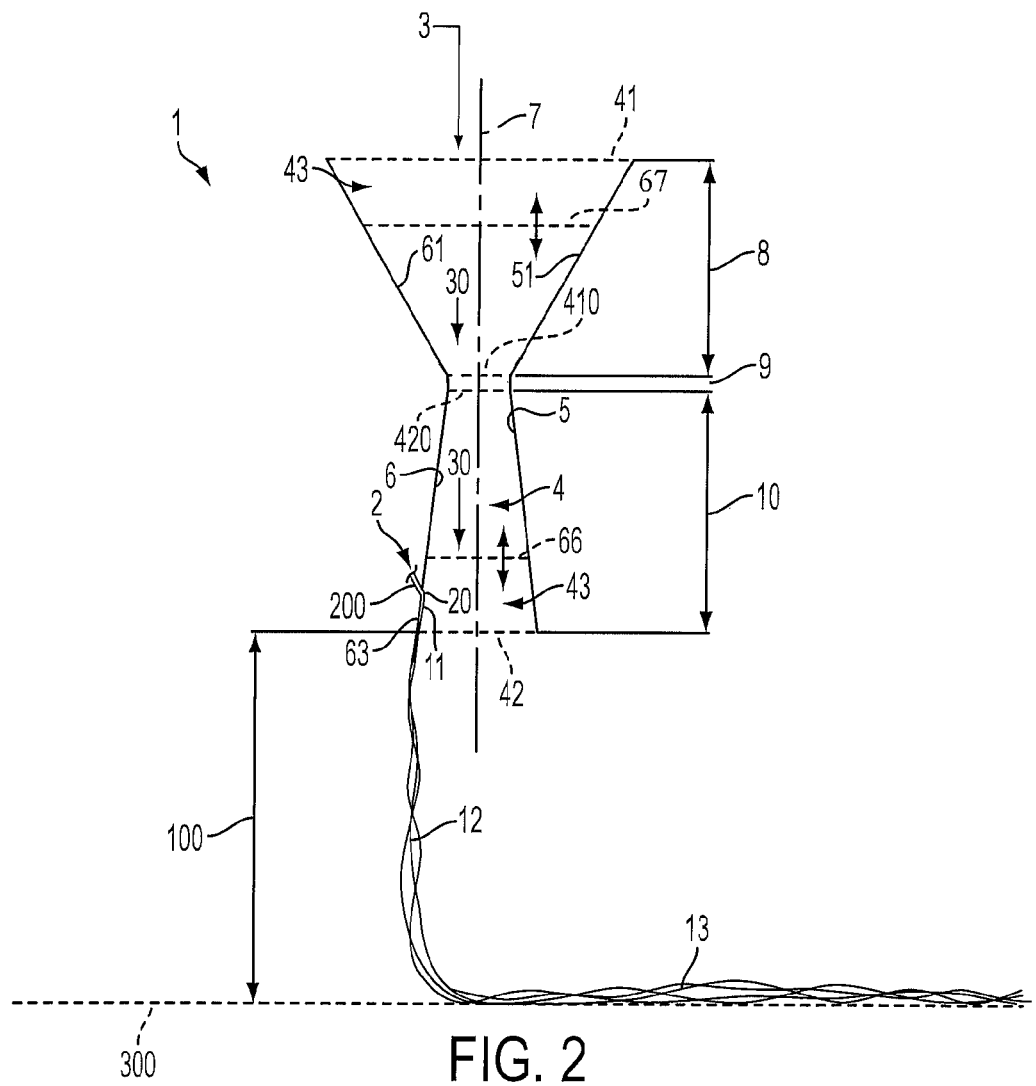
FIG. 2 is a sectional view taken at Section 120 shown in FIG. 12 of an illustrative embodiment of a nozzle system with a single polymer melt introduction passage according to an embodiment of the present invention for forming sub-micron fibers.

Referring to FIG. 2, a nozzle system 1 is illustrated for making microfibers, and particularly nonwoven products comprising sub-micron diameter fibers in web or mat form, according to embodiments of the present invention. The nozzle system 1 shown in FIG. 2 depicts a symmetric gas passage 4, by way of example. A polymer fluid stream 2 is introduced into nozzle system 1 along a curved, straight or other geometrically-suitable polymer passageway 200. An imaginary bisecting axis or surface comprising plane 7 geometrically bisects the space between the opposing walls 51 and 61 in the first section 8, and also the opposing walls 5 and 6 in second section 10. As can be appreciated, if the opposing walls are rectilinear (i.e., generally planar) sloped surfaces, then the bisector 7 is a plane, while if the opposing walls curve to provide a continuous concentric surface, then the bisector 7 is a longitudinal axis. If they are opposing sloped generally planar walls, then space-apart upright forward and rearward sidewalls are also provided that connect the opposing sloped walls (5, 6, and 51, 61), effective to complete the enclosure of gas passage 4 in an fluid-tight manner. For example, a rear side wall 43 is indicated in FIG. 2. The corresponding forward side wall is similar but not shown in FIG. 2 to simplify this illustration.

Figure 12:
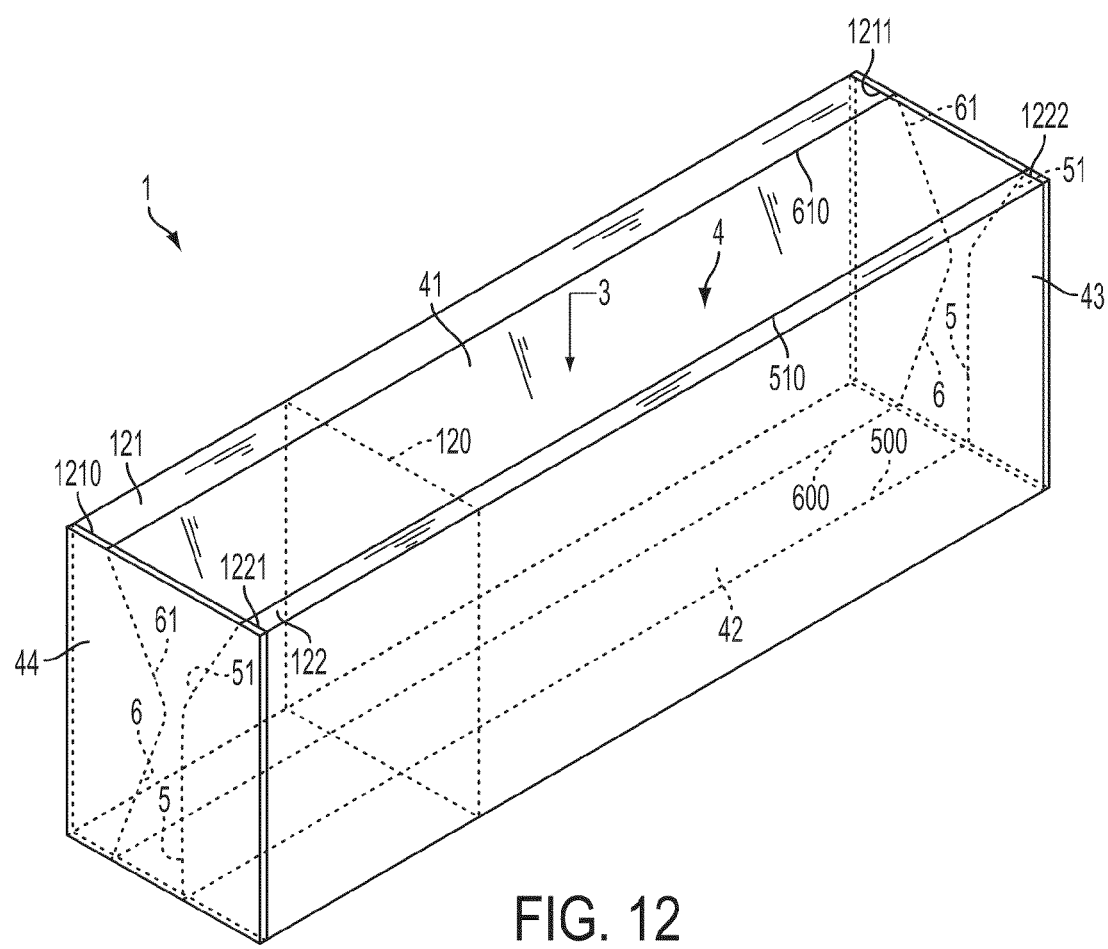
FIG. 12 is an isometric view of the nozzle system of FIG. 1.

With further reference to FIG. 12, the same nozzle system 1 is illustrated in a manner showing rear side wall 43 and a forward side wall 44. The walls 43 and 44 are joined in a fluid-tight manner to opposite ends 1210/1211 and 1221/1222 of die components 121 and 122, respectively, which include the above-described opposing walls that define the gas passage extending through the first and second sections of the nozzle. The die and end wall components can be made of material, e.g., polymer, metal, ceramic, etc., that can be shaped, e.g., by molding, casting, machining, etc. into the appropriate shapes, and are components which can tolerate the microfiber production process conditions, such as described herein. In FIG. 12, the location and shape of the stacked dual-funnel shape defined by the opposing walls is traced with imaginary lines at the end walls 43 and 44 to facilitate the illustration, although it will be appreciated that the end walls 43 and 44 close off the gas passage 4 and the rearward and forward opposite ends of the nozzle. As illustrated in FIG. 12, the upper nozzle inlet 41 is space defined between upper edges 510 and 610 of dies 121 and 122, respectively. The nozzle exit 42 is space defined between lower edges 500 and 600 of dies 121 and 122, respectively.

Figure 13:
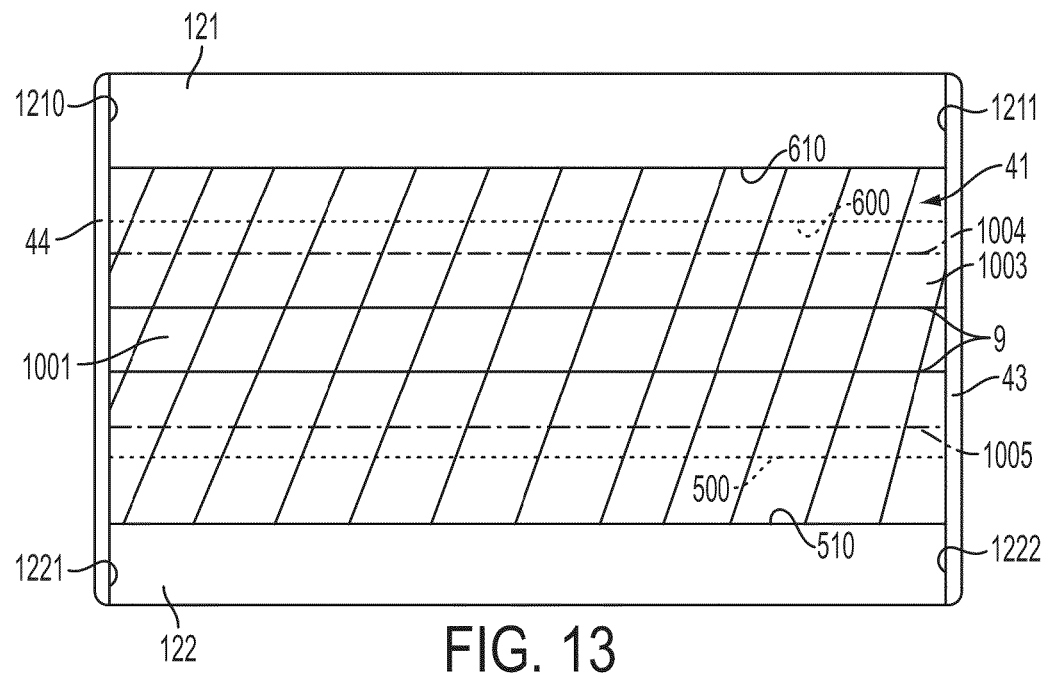
FIG. 13 is a plan view of the top side of the nozzle of FIG. 12.
Figure 14:
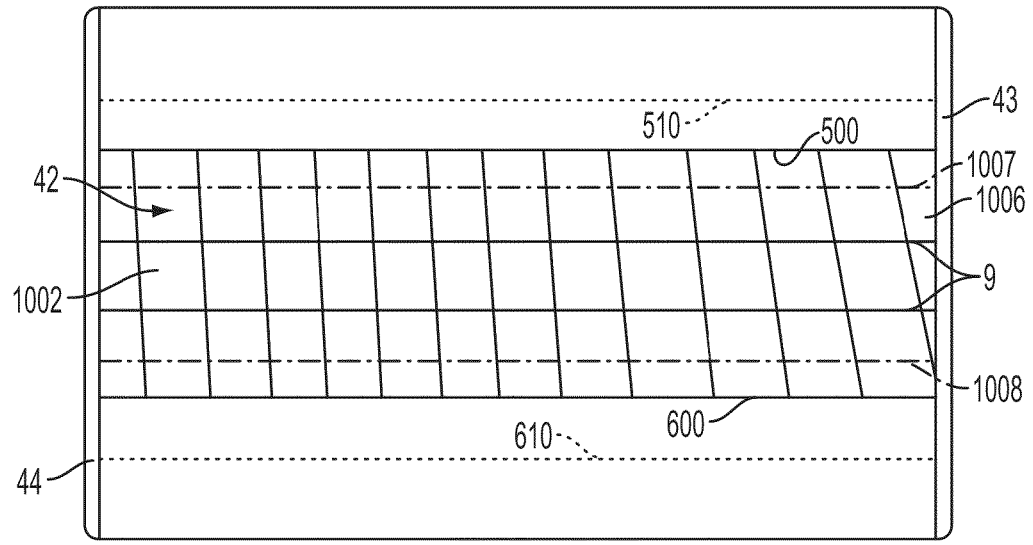
FIG. 14 is a plan view of the bottom side of the nozzle of FIG. 12.

FIGS. 13 and 14 show a nozzle inlet cross-sectional area 1001 (indicated by cross-sectioned area in FIG. 13 defined between edges 610 and 510) and nozzle exit cross-sectional area 1002 (indicated by cross-sectioned area in FIG. 14 defined between edges 500 and 600) of the nozzle inlet opening 41 and exit opening 42, respectively, defined by the die components 121 and 122. Also shown in FIG. 13 is an intermediate cross-sectional area 1003 defined between opposing wall locations 1004 and 1005 (indicated by hatched lines) located between nozzle inlet 41 and the transition region 9 of the nozzle. Also shown in FIG. 14 is an intermediate cross-sectional area 1006 defined between opposing wall locations 1007 and 1008 (indicated by hatched lines) located between the transition region 9 and the nozzle exit 42 of the nozzle. In FIGS. 13 and 14, die edges defining the gas passage that are not visible in the given view have locations indicated generally by dashed lines.

As illustrated, the cross-sectional area of the first section 8 is decreasing, preferably at least substantially continuously, in the downstream direction between the inlet 41 through intermediate area 1003 and further until reaching the transition region 9. The cross-sectional area of the second section 10 is increasing, preferably at least substantially continuously, in the downstream direction between the transition region 9 through intermediate area 1006 and further until reaching the exit opening 42 of the nozzle. In a particular embodiment, the first section 8 of the gas passage 4 has a monotonically decreasing cross-sectional area 1001 from the supply end 41 to the lower discharge end 410 of the first section 8, i.e., the beginning of the transition region 9, and the second section 10 of the gas passage 4 has a monotonically increasing cross-sectional area 1002 from the entrance 420 or beginning of the second section 10 (i.e., the lower end of transition region 9) to the exit end 42 of the second section 10. These criteria also are used in the following additional embodiments of the present invention.

Figure 3:
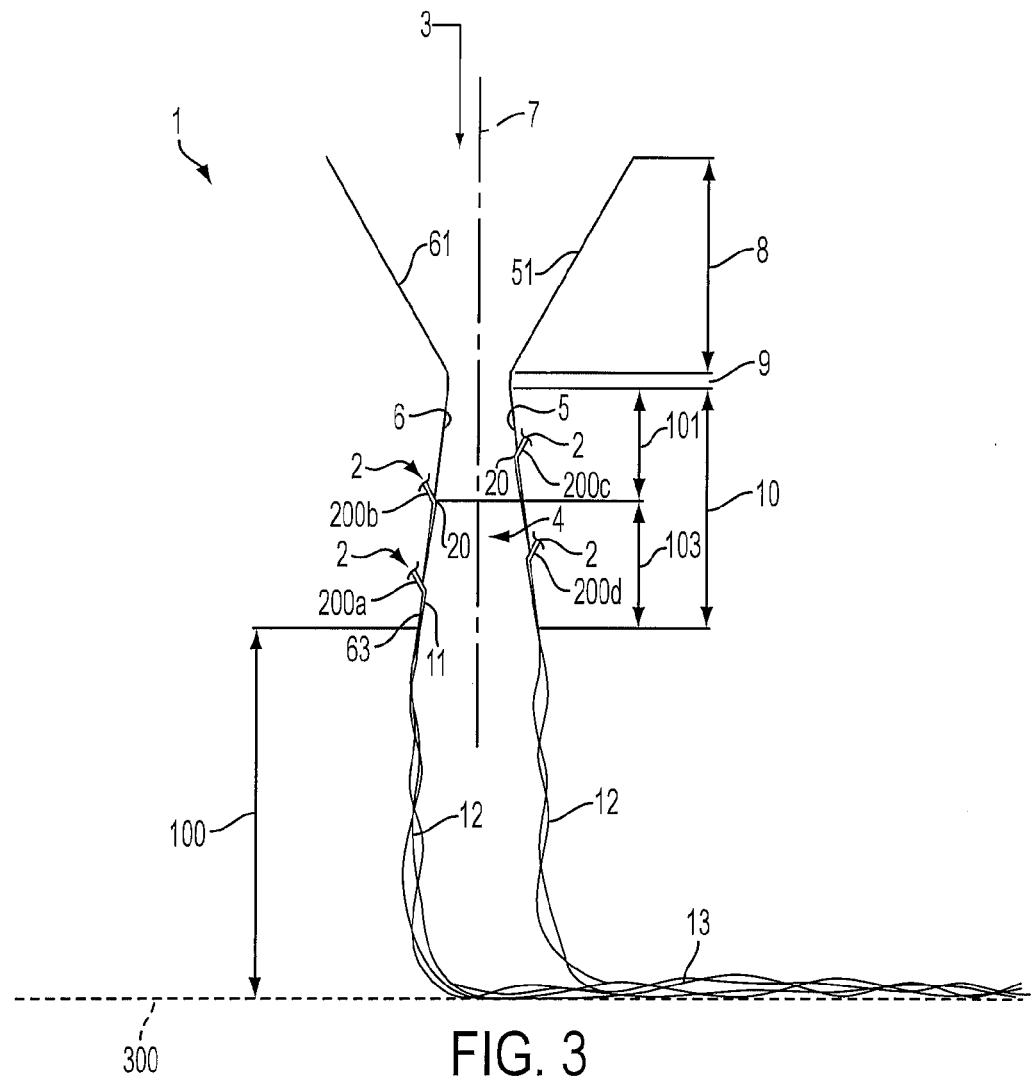
FIG. 3 is a sectional view of an illustrative embodiment of a nozzle system with multiple polymer melt introduction passages according to another embodiment of the present invention for forming sub-micron fibers.

Referring now to FIG. 3, multiple polymer fluid streams 2 also may be introduced concurrently from multiple corresponding polymer introduction passages 200a-d that feed into gas passage 4. The number of polymer fluid streams is not limited other than by practical constraints of a given nozzle set-up. A pressurized gas stream 3 is introduced within gas passage 4 and flows in a direction 30 from upstream nozzle section 8 through transition region 9 to downstream nozzle section 10. The first and second opposing walls 5, 6 comprise first section 8 and a second section 10. The first and second opposing walls 5, 6 converge in the first section 8 towards the transition region or throat section 9, which is the narrowest cross-section of the gas passage 4, as measured in a direction normal to the imaginary bisecting plane 7 between nozzle inlet 41 and nozzle exit 42. Thus, the throat section 9 connects the first section 8 to the second section 10 and conduits gas from one section to the other. At least one of the opposing walls 5 or 6 diverges from plane 7 in the second section 10. In this illustration, the first section 8 has a continuously, progressively decreasing cross-sectional area 67, shown in FIG. 2, measured between the opposing walls 51 and 61 in the gas flow direction 30 from inlet 41 to throat 9. The second section 10 has continuously, progressively increasing cross-sectional area 66 measured between opposing walls 5 and 6 in the gas flow direction 30 from throat 9 to exit 42. These cross-sectional areas 67 and 66 are measured normal to the plane 7 between the opposing walls (i.e., 51, 61 or 5, 6, as applicable) in the direction of the gas flow 3. The polymer fluid streams 2 leave the polymer introduction passage 200 or passages 200a-d at the polymer passage openings 20 and flow out on the opposing walls 5 and 6, and are combined with the high velocity gas stream 3, preferably in the second section 10 of the gas passage 4, to form films 11, i.e., polymer melt exiting the polymer passage openings spreads into rivulets in the form of a film or otherwise uniformly spread out polymer fluid. The film or films are fibrillated to form fibers 12 comprising sub-micron diameter fibers that are collected below the nozzle system 1 as a fibrous web or mat material 13. The amount of fibrillation of films 11 from polymer fluid streams 2 may be different depending on the location of passages 200a-d in the gas passage 4. In a non-limiting embodiment, fibrillated polymer melt in the form of continuous or discrete melt filaments or melt particles, e.g., due to excessive shearing of films 11 from passages 200b and 200c, may combine with fibrillated polymer melt films 11 from passages 200a and 200d, respectively. In such embodiment, if polymer fluid streams from passages 200b and 200c are respectively of dissimilar polymer types from polymer fluid streams from passages 200a and 200d, the fibrous web material may comprise of multi-component fibers, or more specifically bicomponent fibers. The introduction of the polymer melt in the second section of the nozzle system on a heated diverging support wall has been found to especially facilitate production of high quality, high content sub-micron fibers and resulting webs at commercial throughputs. The polymer passage openings 20 into the gas passage 4 can have oval, round, rectangular or other geometric cross-sections. There may be single or multiple polymer passage openings into the gas passage on either opposing surface/wall. The single or multiple openings in the preferred embodiment are on the hotter sides, the polymer melt-side (e.g., see FIG. 6 described in greater detail below).

Referring again to FIG. 3, it has been found that the location of the polymer passage opening 20 for making high quality fibers depends on the type of gas used, the geometry of the nozzle sections, and the pressure of the gas. In one preferred embodiment, the pressure of the entering gas is relatively low, less than about 10 psi, and the extruded polymer film joins with the gas in the upper half (50%) of the second, downstream section 10, indicated as section 101, in which polymer melt is extruded from passage 200c. It has been found in this case that the upper half of the downstream second section 10 can provide an optimal gas velocity region where melt film fibrillation is accomplished very efficiently, yielding higher quality microfiber product. Consequently, it is a preferred embodiment in the case of pressure of the entering gas, exceeding about 10 to 15 psi, that the extruded polymer film joins with the gas in the lower, downstream half (50%) of the second, downstream section 10, indicated as remainder after section 101, in which polymer melt is extruded from passage 200a. As the gas pressure is increased, the preferred location for joining the gas and polymer streams moves downstream, i.e. from passage 200c to passage 200b to passage 200d and to passage 200a for the highest range of gas pressures.

The fibrous web 13, such as shown in FIGS. 2-3, may be comprised of a pile of loose fibers or alternatively a self-supporting unitary web of fibers, depending on process conditions such as temperature, collector distance 100, and so forth. The fibers may also be deposited on a moving substrate web to form an additional layer. Collection of the fibers discharged from the nozzle system 1 may be done, e.g., onto a belt or substrate 300 aided by a vacuum underneath the belt or substrate or other means to keep the fibers deposited on the belt or substrate until further processing. The fiber collecting structure may be, e.g., a mesh or belt across which a vacuum pulls the fibers onto the structure. It can also comprise a preformed fibrous web. It is obvious to those skilled in the art that the nozzle system can be of essentially slot design or of annular design with minor modifications. Although FIGS. 2 and 3 show a nozzle with essentially flat and symmetric geometry, that is shown only for simple non-limiting illustration purposes.

Figure 4:
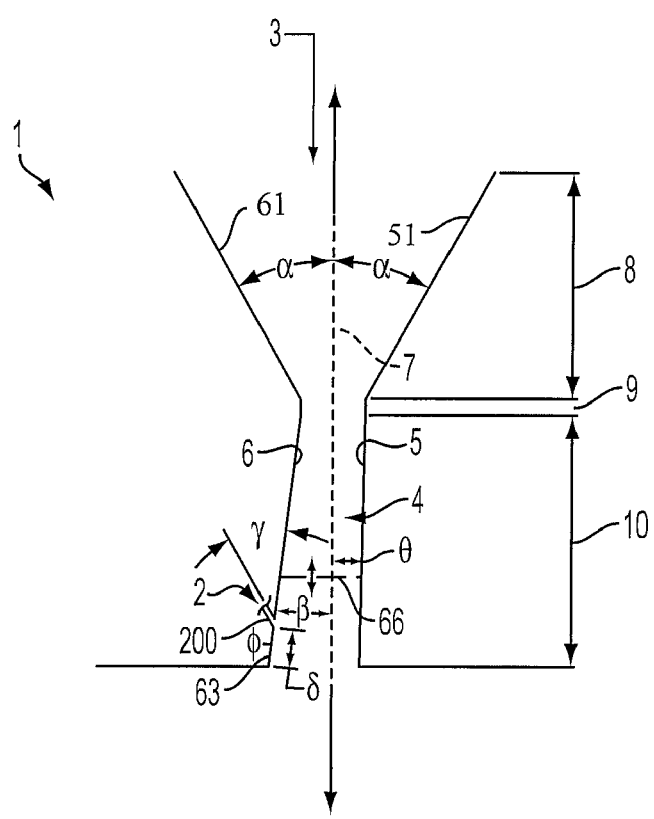
FIG. 4 is a sectional view of an illustrative embodiment of a nozzle system including a divergent wall on the polymer introduction side and an opposing convergent wall in the downstream nozzle section according to another embodiment of the present invention for forming sub-micron fibers.

FIG. 4 shows more details of a nozzle system 1, and in this illustration shows a system with a colder apparatus side that is bounded by the colder first opposing wall 5, and a hotter apparatus side containing the polymer melt components that is bounded by the hotter second opposing wall 6. An axis or plane 7 geometrically bisects the space between the opposing walls 51 and 61 in the first section 8, thus also defining the contraction bisection or half-angles $\alpha$. Preferably, the bisection angle $\alpha$ is between 0.5 and 89.5 degrees, more preferably between 1 and 45 degrees, and most preferably between 15 and 40 degrees. In one of the embodiments the bisection $\alpha$ is about 30 degrees. The opposing wall 6 diverges from the axis or plane 7 in the second section 10, while the overall cross-sectional area 66 of the gas passage 4 in the second section 10, as measured in a direction normal to the direction 30 of gas flow, actually still increases, allowing the gas to expand after the throat section 9. The opposing colder wall 5 is generally converging with respect to the axis or plane 7 at an angle θ. The angle β is measured from the hotter opposing wall 6 to the bisecting axis or plane 7, and the angle θ is measured from the axis or plane 7 to the colder opposing wall 5. Therefore, the angle θ is zero if the opposing wall 5 is parallel to the bisecting axis or plane 7, and negative if it is converging, and positive if it is diverging. The opposing wall 6 has a diverging angle β that should generally be from about 1 degree to less than about 90 degrees relative to the axis or plane 7, or preferably from about 2 to less than about 20 degrees. In one embodiment this diverging angle β is approximately 15 degrees. The opposing wall 5 has a diverging angle that should be less than about +45 degrees relative to the axis or plane 7, but preferably has a converging angle that is from about −45 degrees to about zero degree. The sum of β and θ should preferably be from about 0.1 degree to about 30 degrees. Polymer is directed through the polymer melt introduction passages 200 and exiting into the gas passage 4 through one or more polymer passage openings 20 and flowing in the form of film, rivulets, or hollow tubes, and preferably film, onto the polymer fiberization surfaces 63, also referred to as impingement surfaces. The polymer melt introduction passages 200 can be at various angles γ with respect to the hotter opposing wall 6, anywhere from perpendicular (90 degrees) to almost parallel (co-flowing) to the hotter opposing wall surface 6 (about 5 degrees) or counterflowing at about 170 degrees, but preferably from 10 to 100 degrees. The polymer fiberization surface 63 is present below (in the direction of gas flow) each polymer passage opening 20 and has a smooth continuation of the second opposing wall 6 from before the introduction of the polymer melt 2, and on which the polymer melt flows out before and during fiberization by the gas stream 4. If the polymer fiberization surface 63 is not a smooth continuation of the second opposing hotter wall 6, then it can be at an angle φ that is measured between the polymer fiberization surface below each polymer passage opening in the direction of polymer flow and the respective polymer passage 2, and is less than about 180 degrees. With an angle φ of (90−γ) degrees or lesser relative to polymer passage (in an embodiment with γ less than 90 degrees), the polymer fiberization surface 63 would essentially become zero. Alternatively, the orientation of the polymer fiberization surface may be measured relative to the bisecting plane or axis 7. When measured relative to the bisecting plane or axis 7, the polymer fiberization surface orientation angle ranges from about 90 degrees measured in clockwise direction to about 45 degrees measured in counterclockwise direction. The length "δ" of the polymer fiberization surface 63 is critical for a good fiberization process with few fiber defects such as shot etc., and should be less than about one thousand times the hydraulic diameter of the respective polymer passage opening 20, but preferably less than one hundred times the hydraulic diameter of the respective polymer passage opening 20. A reason for this configuration example is that the opposing wall 6 is heated to keep the pressurized polymer stream 2 molten and flowing. The heated wall 6 in the second section 10 of the gas passage 4 has a diverging angle β of less than 45 degrees from the central, bisecting axis 7, preferably from about 1 to 20 degrees. The colder, unheated wall 5 opposite to the heated wall 6 in the second section 10 of the gas passage 4 may have a converging angle θ of less than 30 degrees from the central axis 7, particularly from about 0.1 to 15 degrees. The ratio, β/θ, of the diverging angle β to the converging angle θ of the opposing walls 6 and 5, respectively, in the second section 10 of the gas passage 4 ranges between 1:1 to 500:1. The cross-sectional inner geometry of the throat 9 may be, e.g., rectangular shaped if the opposing walls are sloped (e.g., see FIG. 2), or alternatively may be rounded if curved opposing walls are used that form a continuous curved inner boundary defining the gas passage. In another embodiment, the gas passage 4 comprises an annular cross-sectional space located between walls 5 and 6. The walls in FIG. 4 are shown as sloped, flat and planar, however the walls in the various sections may be curved. This may be done for walls 5 and 6 in either the first, or the second or the throat sections, or a combination of them. A particular, non-limiting embodiment is presented in the following description.

Figure 5:
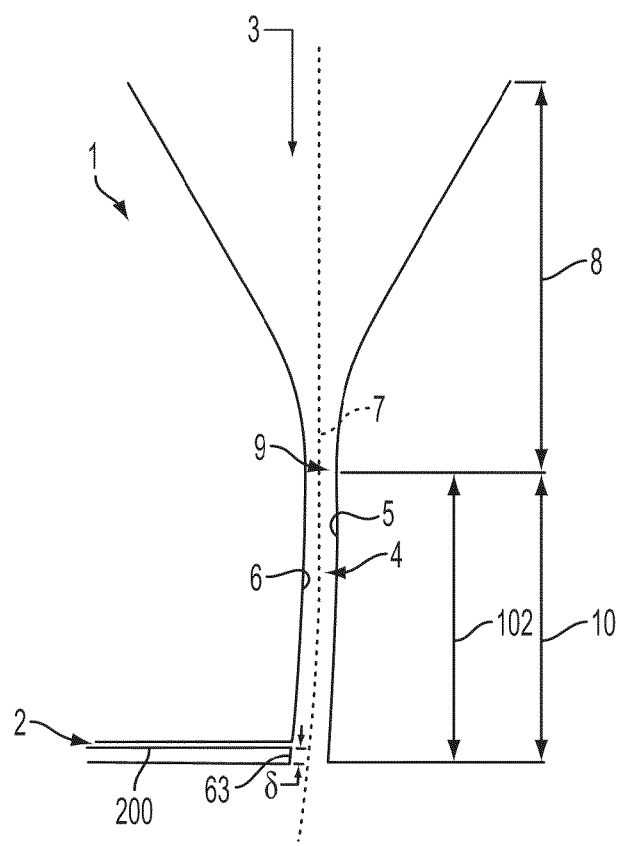
FIG. 5 is a sectional view of an illustrative embodiment of a nozzle system with curved wall surfaces according to another embodiment of the present invention for forming sub-micron fibers.

Referring to FIG. 5, in another embodiment of the nozzle system 1, the opposing walls 6 and 5 in the second section 10 of the gas passage 4 are curved. The curved portion may have a vertical dimension 102 of about 0.004 inch to about 2 inch, and the melt passage 200 may have a hydraulic diameter of about 0.001 inch to 0.100 inch. The ratio, $r_1/r_2$, of the radius of curvature $r_1$ of the hotter wall 6 to the radius of curvature $r_2$ of the colder wall in the second section 10 of the gas passage 4 may range between 1:10,000 to about 100:1.

Referring to FIG. 6, in another embodiment of the nozzle system 1, the geometry of the heated wall 6 is similar to that described in connection with FIG. 5 above. However, in this embodiment, the throat section 9 of the gas passage 4 has greater length in comparison to the embodiments of FIGS. 2-4. The wall 5 opposite to the heated wall 6 converges towards the bisecting axis or plane 7 at an angle θ typically ranging from about 0.1 degree to about 15 degrees. The heated wall 6 diverges from the plane 7 at an angle β typically ranging from about 1 to about 20 degrees. As best seen in FIG. 7, the polymer fluid stream 2 enters the second section 10 of the gas passage 4 through one or a multiplicity of openings 20, and is directed at an angle γ that can range from about 10 to 170 degrees, but is typically ranging from about 30 to about 150 degrees, particularly about 60 to about 95 degrees, relative to the second, hotter wall 6. As shown, the heated wall 6 comprises a tip portion 65 immediately below a polymer introduction passage 2. The integral tip portion 65 has a polymer fiberization surface length less than about 0.050 inch, more preferably less than about 0.010 inch. The curved portion 64 is located immediately below the tip portion 65 curves away from the central axis 7 in the downstream direction 30, and the wall 5 opposite to the heated wall converges towards plane 7 along wall portion 151 thereof and at a location laterally spaced from and adjacent the lower end of tip portion 152 is bent back to form the angle 90+θ with plane 7. The curved portion 64 defines the tip portion 65 at its upper end and also helps prevent gas disruption within the gas passage 4 near the polymer introduction passage 2. The tip portion 65 enhances sub-micron fiber formation. In this illustration, the tip portion 65 has a side 63 facing the gas passage 4 that may be substantially flat and defines the polymer fiberization length δ. When angles γ, β and θ are not in the ranges prescribed herein, the process may be adversely impacted. For instance, it can negatively impact fiberization, fiber sizes, and increase undesirable shot formation. As a non-limiting illustration, the tip portion 65 may have a vertical length or impingement length δ of approximately 0.005-0.050 inch, the curved portion 64 may have a vertical dimension of about 0.040-0.100 inch or greater, and the melt passage 2 may have a hydraulic diameter of about 0.001 to about 0.010 inch, and preferably from 0.002 to about 0.008 inch.

Figure 9:
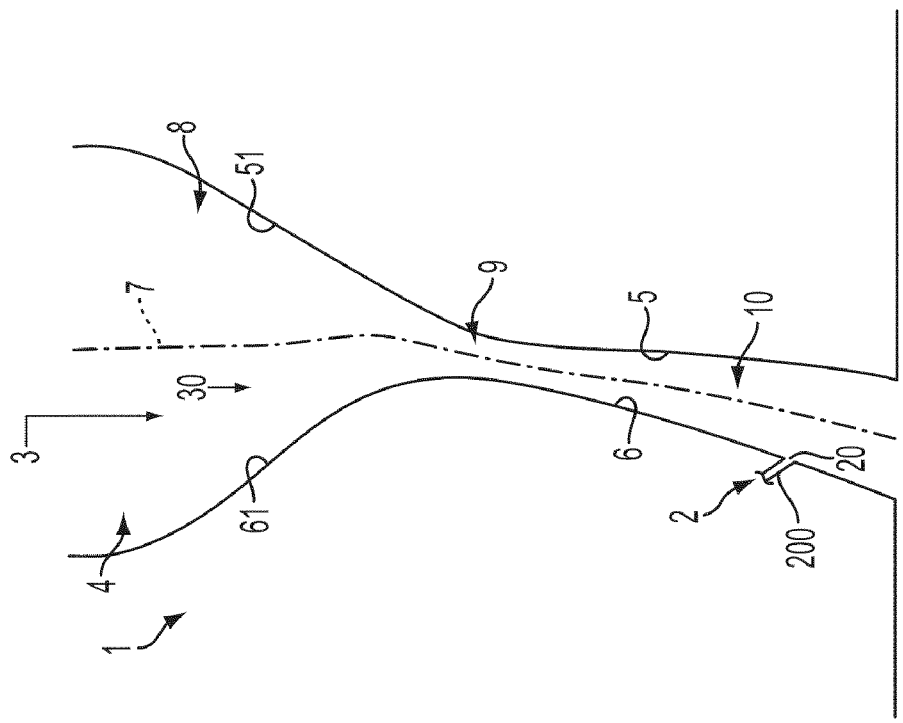
FIG. 9 is a sectional view of an alternative embodiment of the nozzle system of FIG. 8.
Figure 8:
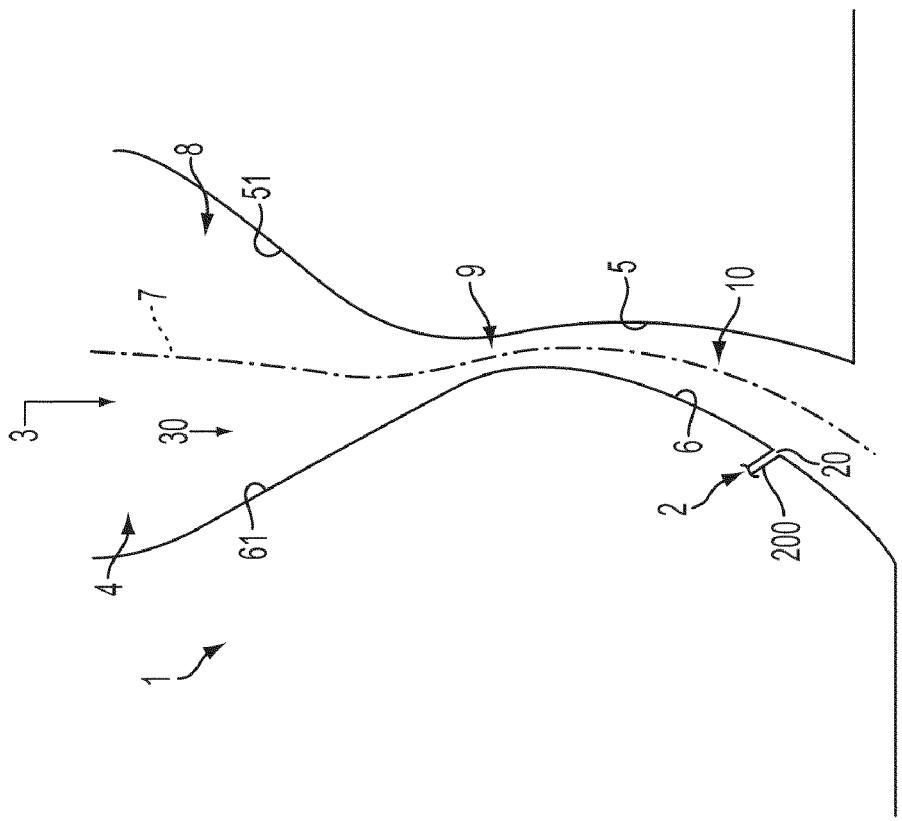
FIG. 8 is a sectional view of an illustrative embodiment of a nozzle system with an imaginary curvilinear bisecting surface for the gas passage in the upstream and downstream sections according to another embodiment of the present invention for forming sub-micron fibers.

Referring to FIGS. 8-9, the first and second walls (5, 6, and 51, 61) of the gas passage 4 of these alternate configurations of nozzle 1 are smoothly curved such that the curvature of the opposing walls 5, 6 in the first section 8 smoothly transitions in the transition region 9 of the gas passage 4 without any sharp edges into the curvature of the opposing walls 51, 61 in the second section 10 where polymer 2 is introduced in this illustration. The opposing walls in the second section 10 of the gas passage 4 are curved such that the hot wall 6 has a convex shape that curves away from the imaginary curvilinear bisecting surface 7 and the cold wall 5 has a concave shape that curves towards the imaginary curvilinear bisecting surface 7 as viewed from within the second section 10 in the gas passage 4. The ratio of the radius of curvature of the hot wall 6 to the radius of curvature of the cold wall 5 in the second section 10 of the gas passage 4 may range from about 1:10,000 to about 100:1, particularly about 1:4 to about 1:1, and more particularly about 1:2 to about 1:1. The radii of curvature of the first and the second walls 51, 61 in the first second section 8 may range from about 1% to about 1000% of the length of the first and the second walls 5, 6 in the second section 10 of the gas passage 4. Each polymer introduction opening 20 particularly may be located in the hot wall 6 in the second section 10. Each polymer opening 20 also may be located between about 20% to about 80% of the curvilinear length of the hot wall 6 in the second section 10 of the gas passage 4. The polymer film can be extruded into the second section 10 through each polymer opening 20 at angle ranging from about 20 degrees to about 160 degrees with respect to the tangent at the hot wall 6 in the second section 10 of the gas passage 4.

Figure 11:
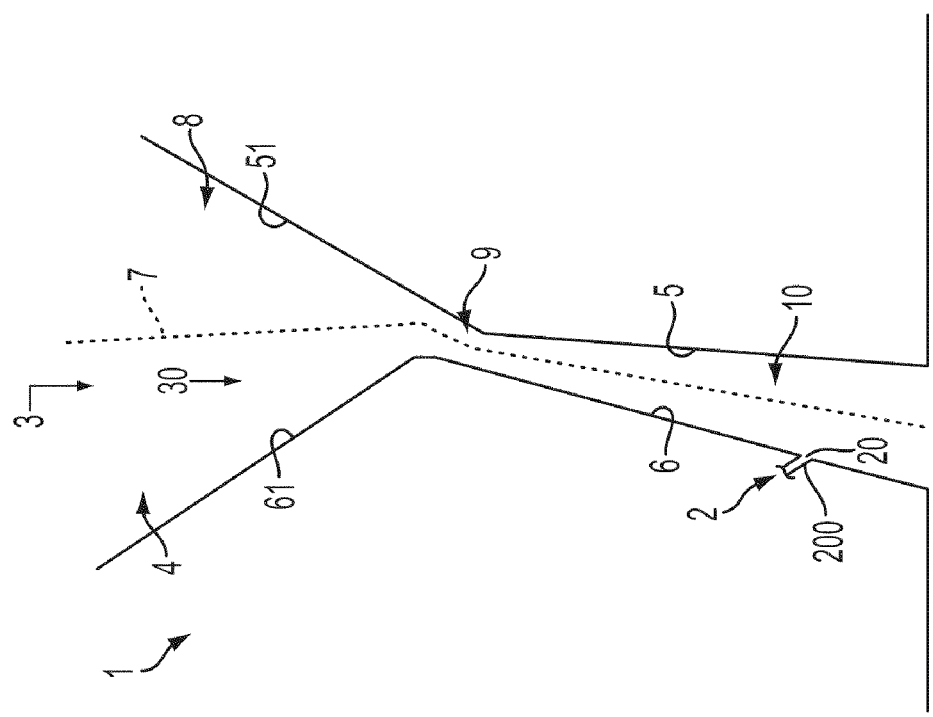
FIG. 11 is a sectional view of an alternative embodiment of the nozzle system of FIG. 10.
Figure 10:
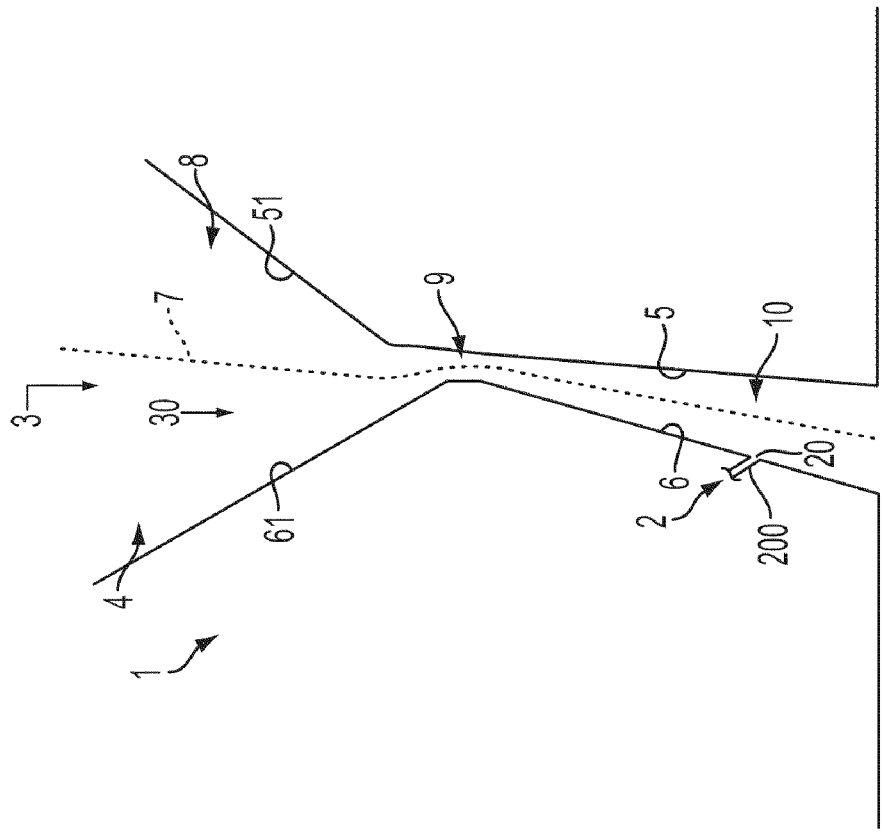
FIG. 10 is a sectional view of an illustrative embodiment of a nozzle system of another embodiment of the present invention for forming sub-micron fibers.

Referring to FIGS. 10-11, the first and second walls (5, 6, and 51, 61) of the gas passage 4 of these alternate configurations of nozzle 1 are sloped and planar and the transition region 9 is an asymmetric bent configuration located between the upstream section 8 and downstream section 10 where polymer 2 is introduced in this illustration.

The nozzle devices used to practice the processes described herein are configurable to be a cartridge that is mountable to conventional die bodies. Conventional die bodies may vary. However, industry standard machine practice can be followed to mount the cartridge embodying the inventive nozzle to a die body. For example, the die bearing the nozzle can be mounted to a die body with a conventional bolt arrangement and flat/shaped surfaces. If a gasket/seal is needed, the channel is machined in the top of the die and/or the location is defined per specific die body. For example, the nozzle system of the present invention may be adapted to fit the lower extrusion body of standard meltspun equipment, e.g., equipment supplied by suppliers such as Reifenhauser, Ason-Neumag, Lurgi Zimmer, Accurate Products, Nordson, and Impianti. Pressurized gas may be supplied to the nozzle system via gas manifolds used in combination with extruder bodies in conventional or commercial equipment or via another source of compressed gas fed to the nozzle inlet via air-tight fluid conduits and connections.

To implement the processes of the invention using the nozzle systems and support equipment illustrated above, the polymer generally is heated until it forms a liquid and flows easily. As indicated in the figures, the polymer melt is introduced into the second section 10 of the gas passage 4 of the nozzle system 1 via opening 20, and forms a film as it descends along the wall surface 6 where located below the opening 20, such as described above. To form the polymer melt, the polymer is heated sufficiently to form a molten polymer flow. By way of example and not limitation, the melted polymer may have a viscosity at the point of fiberization in the nozzle as a positive numerical value less than 30 Pa-s, particularly less than 20 Pa-s, and may range from 0.1 to 20 Pa-s, and particularly from 0.2 to 15. These viscosities are given over a shear rate ranging from about 100 to about 100,000 per second (at 240° C.). The melted polymer generally is at a pressure exceeding atmospheric pressure at the time it is conducted through the gap in the polymer die and is introduced into the gas passage of the nozzle design.

The suitable and optimal melt flow rates of the starting polymer material used to provide the polymer melt may vary depending on the type of polymer material used and other process conditions such as the gas flow properties. In the instance of polypropylene having a glass transition temperature of approximately minus 18° C., a suitable melt flow rate may range, e.g., from about 35 to greater than 2000 decigram per minute, preferably not greater than 1800. The melt flow rate is measured using ASTM method D-1238. If the polymer material used is polypropylene, it may have a polydispersity index (PDI) that ranges, e.g., from about 2.0 to about 4.0. For purposes herein, PDI is a measure of the distribution of molecular weights in a given polymer sample, where the PDI calculated is the weight average molecular weight divided by the number average molecular weight.

The polymer throughput in the inventive process and apparatus will primarily depend upon the specific polymer used, the nozzle design, and the temperature and pressure of the polymer. The aggregate polymer throughput of the nozzle system 1 is more than about 1 kg/hr/m, particularly may range from 1 to 200 kg/hr/m, more particularly from 10 to 200 kg/hr/m, and most particularly between 25 and 70 kg/hr/m. Per orifice, the polymer throughput can be more than about 1, particularly more than about 50, and more particularly more than about 1000 gram per minute per orifice. There can be several introduction gaps or orifices operating at one time to increase the total production throughput. The throughput, along with pressure, temperature, and velocity, are measured at the die orifice exit. A gas curtain or other ancillary gas stream can also be used to affect the spray pattern of sub-micron fibers from two or more nozzles. This gas stream or curtain may aid in shielding the spray formations between adjacent nozzles or may aid in compressing the spray pattern. The gas curtain or stream may improve the uniformity of the web.

The inventive nozzle system is not limited to any particular type of polymer material and allows for the polymer to be independently selected for a specific product application from amongst a wide variety of polymeric materials. Suitable polymeric materials for formation of the fibrous webs of the present invention are those polymers capable of being fibrillated into microfibers using the nozzles of the present invention. These polymers include, but are not limited to polymers selected from the group consisting of polyolefins, polyesters, polyamides, biodegradable polymers, polyurethanes, polystyrenes, alkyd resins, poly-hydroxyalkanoic acids, adhesives or other compounds capable of making fibers, and combinations thereof. Particular examples of the polymeric materials are, e.g., polypropylenes. The polymers may be further selected from homopolymers; copolymers, and conjugates and may include those polymers having incorporated melt additives or surface-active agents or pigments. More than one polymer type may be used at one time via the use of multiple polymer passages 200a-d as illustrated in FIG. 3. In such embodiment, a web 13 comprising multicomponent sub-micron fibers may be produced, as described earlier.

The gaseous fluid may be introduced into the nozzle system at a temperature less than that of the polymer melt, and particularly below 100° C., more particularly less than 50° C., or otherwise at room temperature (e.g., about 30° C., or less). The gaseous fluid also may be heated, although not required for processes of the present invention. Non-limiting examples of the fiberizing gaseous fluid are gases such as air, nitrogen, steam, etc. Additionally suitable gases may include reactive gases or gases with reactive components, or combinations thereof. The pressure of the fiberizing (i.e., fibrillating) gaseous fluid is a positive pressure sufficient to blow the sub-micron fibers and can be slightly above the pressure of the melted polymer as it is extruded out of the gap from which it is introduced into the gas passage of the nozzle system. The fiberizing gaseous fluid will generally have a pressure below 1000 psi, particularly will be less than 100 psi, more particularly will be from about 15 to about 80 psi. The gas flow rate used is sufficient to shear the polymer film at a sufficient rate to fibrillate. The gas flow rate through the nozzle system generally is in the range of 150 kilogram per hour per meter to about 3500 kilogram per hour per meter, particularly 600 to 2000 kilogram per hour per meter; more particularly 1000 to 1800 kilogram per hour per meter. In terms of gas mass flux, measured as unit mass of gas flowing per unit time per unit area, the gas flow ranges from about 15 kg/s/m$^2$ to about 1500 kg/s/m$^2$ depending on the separation between the opposing walls 5 and 6 in throat section 9 and gas flow rate used. For purposes herein, the cross-section of the transition region 9 of the nozzle 1 generally is used for the calculations of gas mass flux.

As one benefit of the present invention, increased sub-micron fiber output is obtained with lower gas demand, making it feasible to reduce energy consumption and/or use smaller scale unit operations to still provide commercially significant sub-micron fiber output levels. In one embodiment, the gas stream and polymer fluid stream are introduced into the second section at a gas stream/polymer fluid stream mass flow rate ratio generally less than about 40:1, particularly less than about 30:1; more particularly less than about 15:1. In one embodiment, the gas stream to polymer fluid stream mass flow ratio may be even less than 10:1. The gas stream to polymer fluid stream mass flow ratio is calculated as kilogram per hour per meter of gas stream through the gas passage to kilogram per hour per meter of polymer fluid stream through all the polymer openings in the second section. Equivalently, the gas stream to polymer fluid stream mass flux ratio is less than about 20:1, more preferably less than about 10:1, and most preferably less than about 7:1. The gas stream/polymer fluid stream mass flux ratio is calculated as kg/s/m$^2$ of gas mass flux through the gas passage to the kg/s/m$^2$ of polymer fluid mass flux flowing through all the polymer openings in the second section of the gas passage. Therefore, improved performance is provided via a more efficient, lower cost process delivering higher quality microfiber or sub-micron fiber webs at commercially viable outputs. Among other advantages, the process is more efficient as it prevents polymer back flow and/or build-up on the gas-side in the fiber forming process. The resulting product web or mat is high quality, as the web possesses good uniformity even at sub-micron fiber sizes, and with less fiber and web defects.

Figure 15:
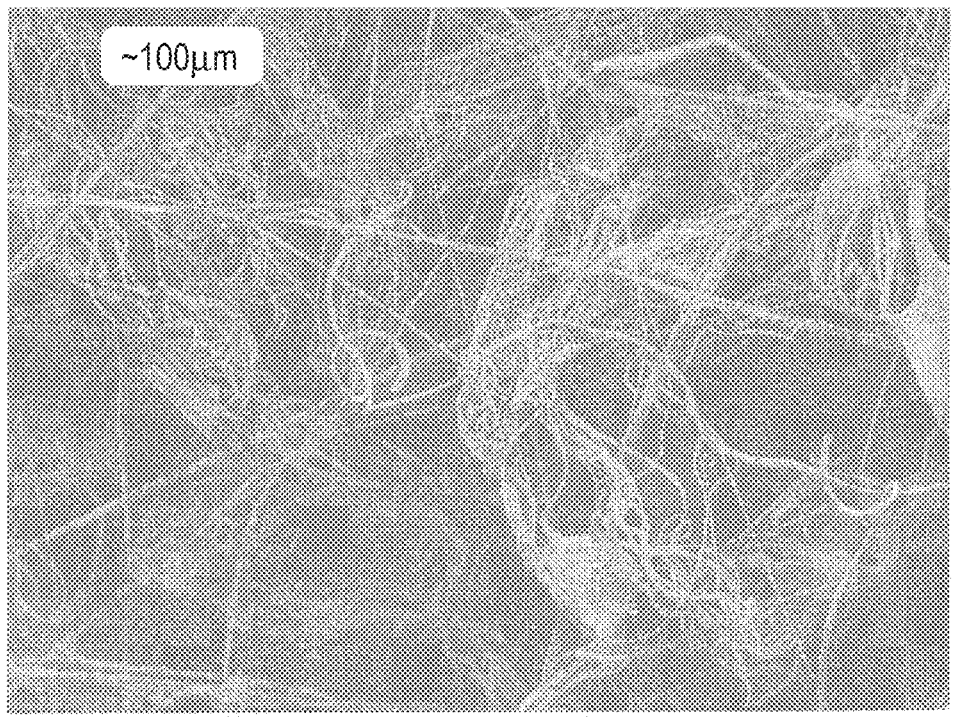
FIG. 15 is an SEM microphotograph (500×) of microfibers with shot.
Figure 16:
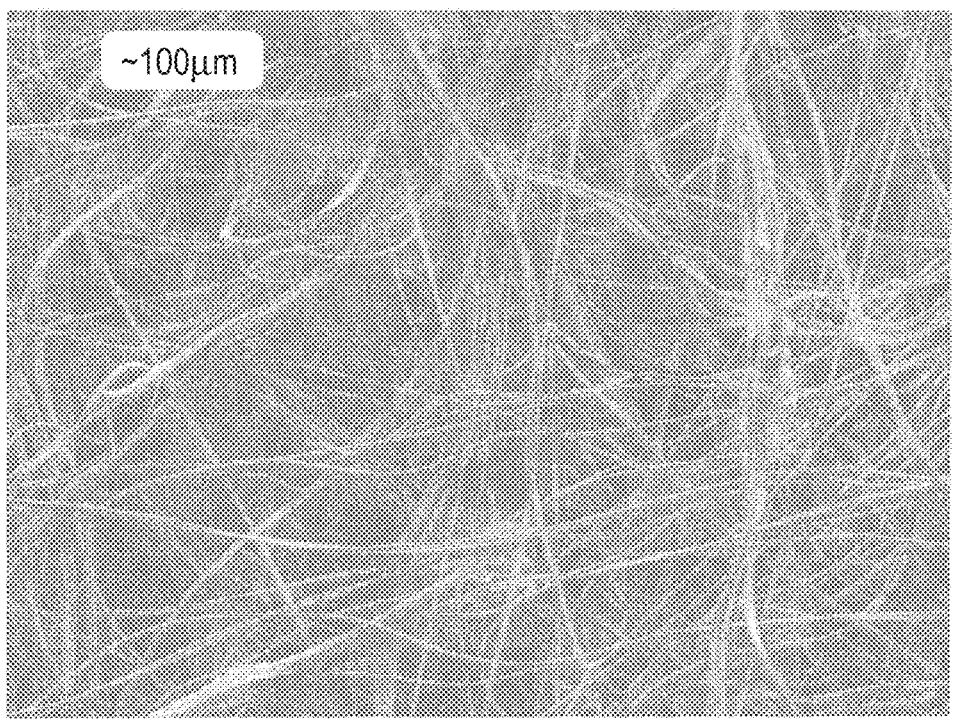
FIG. 16 is an SEM microphotograph (500×) of microfibers with very little or no shot.

High quality microfibers are provided by the present invention within narrow fiber size distributions with minimal fiber defects. For purposes herein, a "high quality" fiber is defined as predominantly sub-micron fibers in a narrow fiber diameter distribution with minimal fiber defects such as shot and dust. "Shot" is defined as unfiberized discrete, largely spherical or ellipsoidal or combinations thereof polymer mass with the largest dimension of the discrete mass ranging from 10 to 500 microns. By way of non-limiting illustration, FIG. 15 is a representative view (500×) showing microfibers with shot produced with standard fiber making equipment and process conditions. The shot creates and leaves large pores and other defects in web formed by the microfibers. FIG. 16 is a representative view (500×) showing microfibers with very little or no shot made with a nozzle system operated according to an embodiment of the present invention. A good fiber distribution is provided and more efficient polymer-fiber and web quality conversion is attained in the fibrous web shown in FIG. 16. "Dust" is another fiber defect, where polymer is sheared uncontrolled or excessively to largely spherical or ellipsoidal or combinations thereof polymer mass with the largest dimension of less than 10 micron. An undesired, low quality of fiber may have an excessive range of fiber diameters, or contain large amount of dust or large amounts of shot. A particularly low quality of fiber, or effect of fiberization, can contain large shot, typically greater than 40 micron in diameter, wherein the mass has enough momentum and thermal energy (i.e., temperature) to penetrate through the entire thickness of the nonwoven web to form a distinct "pin hole" defect therein that can be visually identified well under magnified examination (i.e., over 10 times or 10×) of the web. Therefore, a web made from high quality fiberization, and fibers, has a narrow fiber diameter distribution, no or only a low amount of dust below an average of 10 particles per square-millimeter, no or a low amount of shot below an average of 10 particles per square-millimeter, and no or negligible amount of penetrating and pin-hole creating type of shot. These measurements and evaluations can be done using optical microscopes with magnification of 10× or preferably 100× (for shot), and with scanning electron microscope photographs (for dust and shot). To determine an average, at least ten or preferably over twenty samples need to be taken from a production condition or a selected production period and evaluated in this manner for dust and shot.

The fibrous webs produced in accordance with the present invention may include fibers exhibiting one or more fiber diameters. The fiber diameters can range from sub-micron fiber diameters up to microfiber diameters. For purposes herein "fiber diameter" is determined by SEM with image analysis. Although not limited thereto, the average fiber diameters may be, e.g., about 0.1 to about 1 micron, particularly about 0.1 to about 0.9 micron, and more particularly about 0.3 to about 0.6 micron. The raw nonwoven web product materials directly collected from the process of the present invention generally may comprise more than 35%, particularly more than 75%, more particularly more than 95%, and more particularly more than 99% sub-micron fibers. The standard deviation of fiber diameter distribution generally may be less than about 0.5 micron, particularly less than about 0.3 micron. Further, the nonwoven fabric of the present invention may exhibit basis weights ranging from very light to very heavy. For example, and not by way of limitation, the fabrics may have a basis weight ranging from less than about 5 grams per square meter (gsm), to fabrics having a basis weight greater than about 200 gsm. In a particular embodiment, nonwoven product webs comprising fibers in the indicated submicron fiber ranges have a basis weight of from about 0.01 to 200 gsm, particularly about 0.1 to about 50 gsm. The basis weight of the nonwoven web products may be varied depending on the web application envisioned. For some lighter weight applications, the basis weight of the sub-micron fiber layer may be, for example, less than about 10 gsm, depending upon use of the nonwoven web. It may be desirable to form a web of several superposed layers. The sub-micron fiber layer may be combined with one, two, or more same or different layers. A composite web could comprise, for example, a spunbond layer/sub-micron fiber layer/spunbond layer three-component construction. Another example composite web could be comprised of a spunbond layer/1-10 micron fiber meltblown layer/sub-micron melt-film-fibrillation fiber layer/spunbond layer construction. Basis weights for the total composite webs may range, for example, from about 5 gsm to about 200 or more gsm, but may vary depending on the number and types of layers assembled together.

A uniform sub-micron fiber web can be produced by the process of the present invention. Web uniformity can be measured through several methods. In addition to the shot and dust rate described above, other examples of uniformity metrics include low coefficient of variation of pore diameter, basis weight, air permeability, and/or opacity. Uniformity can also mean lack of fiber bundles or roping, or visible holes, or other such defects. Uniformity may also be evaluated by the hydrohead or other liquid barrier measurement of the web. Pore diameter can be determined by methods known to those skilled in the art. The mean pore diameter of the sub-micron fiber layer may be less than about 15 microns. The desired coefficient of variation for a uniform web can be less than 20%. The lack of roping can be measured by counting the number of ropes or bundles of fibers in a measured area of the web; this is best done jointly with a shot and dust evaluation. The lack of holes can also be measured by counting the number of holes having a diameter above a certain threshold in a measured area of the web. An optical microscope with 10-100× magnification, or scanning electron microscope or other enlargement means can be used. For example, the holes may be counted if they are visible to the naked eye using a light box, or are more than 100 microns in diameter.

The present invention can be implemented on a wide variety polymer materials and the nonwoven web may be used in a wide variety of articles by itself or in combination with other materials. The nonwoven fabric produced in accordance with the invention may include one or more fibrous layers, as well as wovens, scrims, films, and combinations thereof, and may be utilized in the manufacture of numerous home cleaning, personal hygiene, medical, and other end use products where a nonwoven fabric can be employed. The nonwoven web may be used, for example, in gas or liquid filters, medical apparel, medical cleaning wipes, housewrap construction materials, diapers, training pants, adult incontinence pads, catamenials products such as feminine care pads and pantiliners, tampons, personal cleansing articles, personal care articles, and personal care wipes such as baby wipes, facial wipes, body wipes and feminine wipes, and combinations thereof. In addition, the fabric may be utilized as medical gauze, or similar absorbent surgical materials, for absorbing wound exudates and assisting in the removal of seepage from surgical sites. Other end uses include wet or dry hygienic, anti-microbial, or hard surface wipes for medical, industrial, automotive, home care, food service, and graphic arts markets, which can be readily hand-held for cleaning and the like.

The nonwoven of the present invention also may be included in constructs suitable for medical and industrial protective apparel, such as gowns, drapes, shirts, bottom weights, lab coats, face masks, and the like, and protective covers, including covers for vehicles such as cars, trucks, boats, airplanes, motorcycles, bicycles, golf carts, as well as covers for equipment often left outdoors like grills, yard and garden equipment, such as mowers and roto-tillers, lawn furniture, floor coverings, table cloths, and picnic area covers. In particular embodiment, the nonwoven is used in an article selected from the group consisting of bandages, diapers, training pants, adult incontinence pads, catamenials products such as feminine care pads and pantiliners, tampons, personal cleansing articles, personal care articles, and personal care wipes such as baby wipes, facial wipes, body wipes and feminine wipes, and combinations thereof. The nonwoven may also be used in top of bed applications, including mattress protectors, comforters, quilts, duvet covers, and bedspreads. Additionally, acoustical applications, such as interior and exterior automotive components, carpet backing, insulative and sound dampening appliance and machinery wraps, and wall coverings. The nonwoven is further advantageous for various filtration applications, including bag house, plus pool and spa filters. The nonwoven also may be used in other applications, such as battery separators, or as agent/particle carriers (e.g., catalyst carriers).

Depending on the desired end use application of the nonwoven fabric, specific additives may be included directly into the polymeric melt or applied after formation of the web. Suitable non-limiting examples of such additives include absorbency enhancing or deterring additives, UV stabilizers, fire retardants, dyes and pigments, fragrances, skin protectant, surfactants, aqueous or non-aqueous functional industrial solvents such as, plant oils, animal oils, terpenoids, silicon oils, mineral oils, white mineral oils, paraffinic solvents, polybutylenes, polyisobutylenes, polyalphaolefins, and mixtures thereof, toluenes, sequestering agents, corrosion inhibitors, abrasives, petroleum distillates, degreasers, and the combinations thereof. Additional additives include antimicrobial composition, including, but not limited to iodines, alcohols, such as such as ethanol or propanol, biocides, abrasives, metallic materials, such as metal oxide, metal salt, metal complex, metal alloy or mixtures thereof, bacteriostatic complexes, bactericidal complexes, and the combinations thereof.

All amounts, parts, ratios, and percentages described herein are by weight unless otherwise indicated. The following non-limiting example further illustrates the present invention.

EXAMPLE

An extruder (2.5 inch diameter, single screw extruder) and a conventional melt blown die body (25 inch width) were used to provide a source of 1800 MFR polypropylene. The extruder temperature was 650° F. A nozzle generally having the configuration of FIG. 4 was mounted to a conventional extruder die body using a conventional gasketed bolt mount at an upper flat surface region on the nozzle device. A source of pressurized air was fed from an air supply to the inlet of the nozzle via air-tight connections and seals. The nozzle had the following geometrical features (using FIG. 4 as a non-limiting example): an 0.016 inch as the minimum distance between opposing walls 5 and 6 in the throat section 9; cold wall 5 converging at an angle θ of negative 1.5 degrees towards the bisecting plane 7; hot wall diverging away at an angle β of 2 degrees from the bisecting plane 7; the polymer passage entered the second section in the second, downstream half of the second section and had a hydraulic diameter of about 0.008 inch and was oriented at an angle γ of about 32 degrees with the hot wall 6; the polymer fiberization surface length δ was almost zero. The converging section 8 had a vertical length of about 0.090 inch with the bisection angle α about 30 degrees. The throat section 9 had a vertical length of about 0.010 inch, and the diverging section 10 had a vertical length of about 0.200 inch. The pressurized air was introduced into the inlet end (converging section) of the nozzle at a flow rate of 300 scfm (standard cubic feet per minute) and at an air temperature of 80° F. A nonwoven web product was collected and analyzed which revealed that it had the following product attributes: 17.2 gsm basis weight total of the spunbond-layer/submicron-fiber layer/spunbond-layer construction; estimated fiber content produced from the nozzle apparatus of current invention was about 15% (2.7 gsm); Mean diameter of the fibers in the submicron-fiber layer: 0.45 micron; standard deviation: 0.15; ratio of standard deviation/mean of submicron fiber diameter distribution=0.33; and fiber diameter range: 0.1 to 0.85 microns.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

The invention claimed is:

1. An apparatus for forming fibers of sub-micron size, comprising:
  first and second opposing walls defining a gas passage, of which at least one of the walls is heatable, wherein said gas passage being operable to receive pressurized gas from a pressurized gas source and to conduct the pressurized gas as a gas stream in an upstream to a downstream direction within the first and second opposing walls, wherein said gas passage comprises a first, upstream section into which the gas enters from a supply end, a transition region, and a second, downstream section in which the gas flows to an exit end, wherein the transition region fluidly connects the first section to the second section, and the gas passage ends at the exit end of the second section, and wherein said first section of the gas passage having a decreasing cross-sectional area from the supply end to the transition region, and said second section of the gas passage having an increasing cross-sectional area from the transition region to the exit end of the second section;
  at least one bounded polymer passage operable to receive molten polymer from a polymer extruder and to conduct the molten polymer as at least one flowable polymer fluid stream to at least one of said walls that is heatable in the gas passage, wherein the polymer passage ends in at least one polymer passage opening in at least one of said opposing walls that is heatable, wherein each said opening is operable to extrude polymer fluid stream in the form of a film onto a heatable wall wherein the film is joinable with the gas stream of the gas passage to fibrillate the polymer film to form fibers comprising sub-micron fibers that exit from the exit end of said second section of the gas passage.

2. The apparatus of claim 1, wherein the at least one polymer passage opening from which polymer film extrudes is located in the second section of the gas passage.

3. The apparatus of claim 1, wherein the at least one polymer passage opening from which polymer film extrudes is located in a lower, downstream half of the second section as determined relative to a length of said at least one of said opposing walls that is heatable and having the at least one polymer passage opening, wherein said length extends between the transition region and the exit end of the second section.

4. The apparatus of claim 1, wherein said first section of the gas passage has a monotonically decreasing cross-sectional area from the supply end to the transition region, and said second section of the gas passage has a monotonically increasing cross-sectional area from the transition region to the exit end of the second section.

5. The apparatus of claim 1, wherein:
  a first imaginary bisecting surface, defined as a first angular bisector of a first space between the first and second walls in the first section, geometrically divides the first section into two halves with about equal volumes and first and second bisection angles defined between the first angular bisector and the first wall and second wall, respectively, and
  a second imaginary bisecting surface, defined as a second angular bisector of a second space defined between the first and second walls in the second section, geometrically divides the second section into two halves with about equal volumes and third and fourth bisection angles defined between the second angular bisector and the first wall and second wall, respectively.

6. The apparatus of claim 5, wherein the first and second bisection angles of the first and the second walls with respect to the first imaginary bisecting surface each range from about 15 to about 40 degrees in the first section of the gas passage, and wherein the third and fourth bisection angles of the first and the second walls with respect to the second imaginary bisecting surface each range from about 2 to about 20 degrees in the second section of the gas passage.

7. The apparatus of claim 5, wherein the at least one of said opposing walls that is heatable in the second section diverges away from the second imaginary bisecting surface at a diverging angle that ranges from about 1 degree to 20 degrees, and the other opposing wall in the second section converges towards the second imaginary bisecting surface at a converging angle that ranges from about 0.1 degree to about 15 degrees.

8. The apparatus of claim 7, wherein a ratio between the diverging angle of said at least one of said opposing walls that is heatable relative to the second imaginary bisecting surface and the converging angle of the other opposing wall relative to the second imaginary bisecting surface ranges from about 1:1 to about 500:1.

9. The apparatus of claim 5, wherein the apparatus is operable such that a polymer film extruding from each said at least one polymer fluid passage opening is flowable with a gas flow along a polymer fibrillation surface having an orientation angle with respect to the second imaginary bisecting surface ranging from about 90 degrees measured in clockwise direction to about 45 degrees measured in counterclockwise direction.

10. The apparatus of claim 9, wherein a length of the polymer fibrillation surface corresponding to each said at least one polymer fluid passage opening is less than about one thousand times the hydraulic diameter of the at least one polymer fluid passage opening.

11. The apparatus of claim 5, wherein the first imaginary bisecting surface is a first imaginary curvilinear bisecting surface, and the second imaginary bisecting surface is a second imaginary curvilinear bisecting surface, and wherein the opposing walls in the second section of the gas passage are curved wherein the at least one of said opposing walls that is heatable has a convex shape that curves away from the second imaginary curvilinear bisecting surface and the other opposing wall has a concave shape that curves towards the second imaginary curvilinear bisecting surface as viewed from within the second section in the gas passage.

12. The apparatus of claim 11, wherein a ratio of a radius of curvature of the at least one of said opposing walls that is heatable to a radius of curvature of the opposing wall in the second section of the gas passage ranges from about 1:10,000 to about 100:1.

13. The apparatus of claim 1, wherein the first and second walls of the gas passage are smoothly curved wherein the curvature of the opposing walls in the first section smoothly transitions without any sharp edges into the curvature of the opposing walls in the second section in the transition region of the gas passage.

14. The apparatus of claim 1, wherein the apparatus is operable wherein polymer film forms only on one of said at least one opposing walls that is heatable, and each of said at least one polymer fluid passage openings from which polymer film extrudes is located in an upper half of the second section as determined relative to a length of said at least one of said opposing walls that is heatable between the transition region and the exit end of the second section.

15. The apparatus of claim 1, wherein the at least one polymer passage opening comprises a slit with a hydraulic diameter defined as four times cross-sectional area of the slit divided by inner perimeter of the slit, said hydraulic diameter of the slit ranging from about 0.001 inch to about 0.100 inch.

16. The apparatus of claim 1, wherein an angle defined between a centerline of the at least one polymer passage opening and the at least one of said opposing walls that is heatable containing the at least one polymer passage opening ranges from about 10 degrees to about 100 degrees.

17. The apparatus of claim 1, wherein the at least one of said opposing walls that is heatable is heatable to a temperature that is at least 50° C. higher than the other opposing wall, and only the at least one of said opposing walls that is heatable has said at least one polymer fluid passage opening.

18. The apparatus of claim 1, wherein an imaginary bisecting plane bisects the spaces between the first and second walls in both the first and second sections, wherein the first and second walls of the gas passage are heatable to about a same temperature operable to provide symmetric thermal states with respect to the imaginary bisecting plane.

19. The apparatus of claim 5, wherein the first imaginary bisecting surface is a first imaginary bisecting plane, and the second imaginary bisecting surface is a second imaginary bisecting plane.

20. The apparatus of claim 6, wherein the first imaginary bisecting surface is a first imaginary bisecting plane, and the second imaginary bisecting surface is a second imaginary bisecting plane.

* * * * *